United States Patent Office 3,586,606
Patented June 22, 1971

3,586,606
PROCESS FOR PRODUCING 9-β-D-RIBOFURANO-
SIDE - 5' - PHOSPHORIC ACID ESTERS OF 2-
SUBSTITUTED-6-HYDROXYPURINES
Kiyoshi Nakayama, Sagamihara-shi, Haruo Tanaka,
Machida-shi, and Hiroshi Hagino, Hachioji-shi, Japan,
assignors to Kyowa Hakko Kogyo Co., Ltd., Tokyo,
Japan
No Drawing. Filed Oct. 8, 1968, Ser. No. 765,989
Claims priority, application Japan, Oct. 13, 1967,
42/65,426
Int. Cl. C12d 13/06
U.S. Cl. 195—28                                 10 Claims

ABSTRACT OF THE DISCLOSURE

A process for producing ribotides of 2-substituted-6-hydroxypurines by fermentation. Specifically, the products are 9-β-D-ribofuranoside-5'-phosphoric acid esters of said hydroxypurines. They are useful as model substances of RNA and as structural analogs of nucleotides constituting nucleic acid. The sodium salts thereof are good flavor enhancers. They are produced by culturing a microorganism in a nutrient medium containing the 2-substituted-6-hydroxypurines as additives.

---

This invention relates to a process for producing 9-β-D-ribofuranoside-5'-phosphoric acid esters of 2-substituted-6-hydroxypurines. More particularly, it relates to a process for the production of said compounds by fermentation. Even more particularly, the invention relates to a process for producing 9-β-D-ribofuranoside-5'-monophosphoric, diphosphoric and/or triphosphoric acid esters of 2-substituted-6-hydroxypurines by fermentation in a culture medium containing certain 2-substituted-6-hydroxypurines.

The products of the present invention, 9-β-D-ribofuranoside-5'-monophosphoric, diphosphoric and/or triphosphoric acid esters of 2-substituted-6-hydroxypurines, have the following general Formula I:

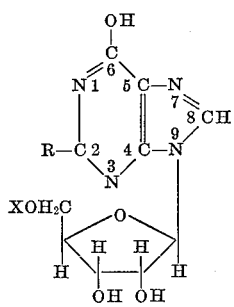

wherein

R is $CH_3$, $CH_2-CH_3$, SH, $S-CH_3$, $S-CH_2-CH_3$, $NHCH_3$ or

and
X is

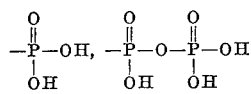

or

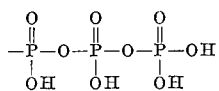

Of these compounds, 2-dimethylamino-6-hydroxypurine-9-β-D-ribofuranoside-5'-phosphoric acid esters ($N^2$, $N^2$-dimethylguanylic acid) have been found in the RNA of yeasts [Journal of Biological Chemistry, vol. 234, p. 1525 (1959); Journal of the American Chemical Society, vol. 87, p. 3752 (1965)] and, also, the existence of 2-methylamino - 6 - hydroxypurine-9-β-D-ribofuranoside-5'-pyrophosphoric acid esters ($N^2$-methylguanylic acid) in RNA has been described [for example, Biochimica Biophysica Acta, vol. 61, p. 340 (1962)]. Moreover, it has been reported [Summary of Lectures of the 1967 General Meeting of the Japan Agricultural Chemical Society, pp. 187–8 (1967)] that other compounds thereof are the structural analogs of nucleotides constituting nucleic acid and, furthermore, that some of them have pleasant and flavorous properties and that the synergistic effect thereof on sodium glutamate is more significant than that of inosinic acid or guanylic acid.

The synthesis of these compounds heretofore has been conducted by chemical synthetic methods. However, these methods are inadequate for industrial purposes because of the expensive raw materials which must be employed and because of necessary complicated manufacturing procedures. As the result of investigations on producing such compounds, the present inventors have discovered the phenomenon that the addition of compounds having the constitution of Formula II below, i.e., 2-substituted-6-hydroxypurines, to a culture medium at the initiation of or during the culturing of microorganisms therein makes it possible to produce and accumulate the ribotides thereof (compounds of Formula I) in the resultant culture liquor and in the microorganism cells. This feature forms the basis of the present invention.

Formula II, representing compounds added to the culture medium in accordance with the present invention, is as follows:

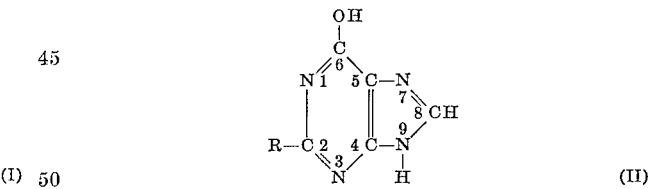

wherein

R is $CH_3$, $CH_2-CH_3$, SH, $S-CH_3$, $S-CH_2-CH_3$, $NHCH_3$ or

Accordingly, one of the objects of the present invention is to provide an improved process for the production of 9-β-D-ribofuranoside-5'-phosphoric acid esters of 2-substituted-6-hydroxypurines (Formula I) which overcomes the disadvantages and deficiencies of the prior art methods.

Another object of the present invention is to provide a process for producing compounds of Formula I by fermentation which may be carried out in an efficacious and simple manner.

A further object of the invention is to provide a process for producing compounds of Formula I by fermentation which may be carried out advantageously on an industrial scale at low cost to give a high yield of product.

A still further object of the invention is to provide 9-β-D-ribofuranoside-5'-monophosphoric, diphosphoric and/or triphosphoric acid esters of 2-substituted-6-hydroxypurines.

These and other objects and advantages of the present invention will become apparent to those skilled in the art from a consideration of the following specification and claims.

As discussed above, the most significant characteristic of the present invention is the culturing of microorganisms in a nutrient medium having added thereto compounds having the structure of Formula II. Accumulation of compounds of Formula I takes place in the resultant culture liquor and recovery thereof can be effected quite readily in a conventional manner.

The microorganisms employed in the fermentation process of the present invention include various microorganisms belonging to Schizomycetes, that is, bacteria and ray fungi, and Eumycetes, namely molds and yeast. Microorganisms operable in the process cannot be limited to specific taxonomical groups of microorganisms belonging to these classes since such a wide variety can be utilized.

As culture media to be employed in the present invention, any nutrient medium which contains 2-substituted-6-hydroxypurines may be used and, in an extreme case, the objective of the present invention can be accomplished even by adding the cells of microorganisms to an aqueous solution containing only the compounds having the structure of Formula II and conducting culturing since the compounds having the structure of Formula I are still produced in the cultured liquor. Either a synthetic culture medium or a natural nutrient is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, etc., or alcohols, hydrocarbons, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. It is also advantageous and desirable in some instances to add phosphoric acid compounds such as phenylphosphoric acid, ribose-1-phosphoric acid, inosinic acid, adenylic acid, guanylic acid, and the like to the medium.

As noted above, the 2-substituted-6-hydroxypurines having the structure of Formula II may be added to the medium at any time during culturing or at the initiation of culturing. Thus, these compounds may be added to the medium at the beginning of culturing or, for example, at the middle point of culturing. Moreover, the addition can be made either all at once or intermittently in small portions.

The amount of 2-substituted-6-hydroxypurines added to the medium may be varied quite widely. In the case of conducting culturing with a large quantity of cells of microorganisms wherein the 6-hydroxypurines are added to the medium at a time when the microorganisms are only growing slightly, they may be added in high concentration. On the other hand, in the case of adding the 6-hydroxypurines to the medium at the initial stage of fermentation wherein a large growth of microorganisms is taking place, it is desirable to add them intermittently in small portions since the growth of the microorganisms may be inhibited if too large an amount thereof is added all at once.

The conditions of culturing, other than those already specified hereinabove, are those conventionally used in the fermentation art. Thus, the fermentation or culturing of the microorganisms is conducted under aerobic conditions, such as aerobic shaking of the culture or with stirring and aeration of a submerged culture, at a temperature of, for example, about 20 to 40° C. and at a pH of about 4.0 to 9.5. After about 2 to 7 days of culturing under these conditions, large amounts of 9-β-D-ribofuranoside-5'-monophosphoric, diphosphoric and/or triphosphoric acid esters of 2-substituted-6-hydroxypurines are found to be accumulated in the resultant culture liquor as well as in the microorganism cells.

After the completion of culturing, the ribotides produced by the present invention may be isolated and purified from the culture liquor and the cell bodies in a conventional manner. For example, they may be extracted from the microorganism cells with perchloric acid, warm alcohol or the like. Ribotides accumulated in the cultured liquor can be recovered according to procedures such as ion exchange resin treatment, adsorption with carbon powder, extraction with solvents, chromatography, precipitation or the like.

The following examples are given merely as illustrative of the present invention and are not to be considered as limiting. Unless otherwise noted, the percentages therein and throughout the application are by weight per liter of water. Examples of microorganism strains which may be advantageously employed in the present invention are described therein.

EXAMPLE 1

*Brevibacterium ammoniagenes* ATCC 6872 is used as the seed microorganism and is cultured in a seed culture medium containing 2% of glucose, 1% of peptone, 1% of yeast extract, 0.3% of NaCl and 30 μg./l. of biotin at 30° C. for 24 hours. Then, the microorganism is inoculated in a ratio of 10% (by volume) into a fermentation medium having the following composition:

Glucose—100 g.
Urea—6 g.
$K_2HPO_4$—10 g.
$KH_2PO_4$—10 g.
$MgSO_4 \cdot 7H_2O$—10 g.
$CaCl_2 \cdot 2H_2O$—0.1 g.
Biotin—30 μg.
Calcium pantothenate—2 mg.
Thiamine—5 mg.
Peptone—5 g.

The fermentation medium is prepared in one liter of water and the pH thereof is adjusted to 8.0 with NaOH. Thereafter, the fermentation medium is poured into flasks and the flasks are sterilized at 1 kg./cm.² for 10 minutes in an autoclave.

Twenty ml. portions of the mixture of seed and fermentation media are poured into 250 ml. of conical flasks, respectively, and are sterilized before use. Culturing is then carried out with aerobic shaking of the flasks at 30° C.

At 48 hours after the beginning of culturing, 2-methyl-6-hydroxypurine is added to the fermentation liquor in a concentration of 2 mg./ml. and further culturing is continued for 48 hours. As a result, 2.2 mg./ml. of 2-methyl - 6 - hydroxypurine - 9-β-D - ribofuranoside-5'-pyrophosphoric acid ester is accumulated in the fermentation liquor.

The ribotide produced is adsorbed on the polystyrene strongly basic anion exchange resin, Dowex-1 (a trade name, Dow Chemical Company, U.S.A.) (formic acid type), and thereafter, is eluted with formic acid. Fractions containing ribotide are neutralized and adsorbed in carbon powder, and, thereafter, eluted with 50% ethanol containing 3% $NH_4OH$. By evaporating the solvent, the ribotide is recovered as a powder.

EXAMPLE 2

Culturing is conducted in the same manner as described in Example 1, except that 2-ethyl-6-hydroxypurine is used instead of 2-methyl-6-hydroxypurine. Consequently, 1.8 mg./ml. of 2-ethyl-6-hydroxypurine-9-β-D-ribofuranoside-5'-pyrophosphoric acid ester is accumulated in the fermentation liquor.

EXAMPLE 3

Culturing is conducted in the same manner as described in Example 1, except that 2-methylthio-6-hydroxypurine is used instead of 2-methyl-6-hydroxypurine. As a result, 2.0 mg./ml. of 2-methylthio-6-hydroxypurine-9-β-D-ribofuranoside-5'-pyrophosphoric acid ester is accumulated in the fermentation liquor.

EXAMPLE 4

Culturing is conducted in the same manner as in Example 1, except that 2-ethylthio-6-hydroxypurine is added in a concentration of 3 mg./ml. to the medium instead of 2-methyl-6-hydroxypurine in the concentration of 2 mg./ml. 3.3 mg./ml. of 2-ethylthio-6-hydroxypurine-9-β-D-ribofuranoside-5'-pyrophosphoric acid ester is accumulated in the fermentation liquor.

EXAMPLE 5

Culturing is conducted in the same manner as in Example 1, except that 2-methylamino-6-hydroxypurine is added in a concentration of 3 mg./ml. at 72 hours after the start of culturing and, moreover, cultivation is continued for 48 hours, instead of adding 2 mg./ml. of 2-methyl-6-hydroxypurine at 48 hours after the start of culturing. 0.8 mg./ml., 0.6 mg./ml. and 0.9 mg./ml. of the 5'-triphosphoric acid ester, the 5'-diphosphoric acid ester and the 5'-monophosphoric acid ester of 2-methylamino-6-hydroxypurine - 9-β-D - ribofuranoside, respectively, are accumulated in the resultant culture liquor.

EXAMPLE 6

Culturing is conducted in the same manner as described in Example 5, except that $N^2,N^2$-dimethylguanine is used instead of 2-methylamino-6-hydroxypurine. 1.1 mg./ml., 0.3 mg./ml. and 0.3 mg./ml. of the 5'-triphosphoric acid ester, the 5'-diphosphoric acid ester and the 5'-monophosphoric acid ester of $N^2,N^2$-dimethylguanine-9-β-D-ribofuranoside are accumulated in the fermentation liquor, respectively.

EXAMPLE 7

Culturing is conducted in the same manner as described in Example 1, except that 2-mercapto-6-hydroxypurine is used instead of 2-methyl-6-hydroxypurine. As a result, 0.9 mg./ml. of 2-mercapto-6-hydroxypurine-9-β-D-ribofuranoside-5'-pyrophosphoric acid ester is accumulated in the fermentation liquor.

EXAMPLE 8

5 ml. of the reaction solution containing, respectively, 100 mg. of living cells (reduced as dry weight) of various microorganisms (Table 1), 25 mg. of 2-methylamino-6-hydroxypurine, 50 mg. of $KH_2PO_4$ and 0.1 mg. of $MgCl_2$ (adjusted to pH 7.0) is cultured at 30° C. for 5 hours. 5 ml. of 1 N cold perchloric acid is added thereto. The obtained extraction-solution is neutralized with 10 N NaOH, 0.1 g. of carbon powder is added thereto, and then, shaking is conducted for 10 minutes. After filtration, the carbon powder is washed with 20 ml. of water and, subsequently, elution with a mixture-solution (25%, 0.5 N) of ethanol and ammonia is carried out. The effluent is concentrated to 1 ml. under reduced pressure, and the production of 2-methylamino-6-hydroxypurine-9-β-D-ribofuranoside-5'-phosphoric acid ester in the concentrated solution in each case is examined by paper chromatography. The results are shown in Table 1. (+ indicates the presence of said ribotide compound.)

TABLE 1

| Microorganisms: | Production of 2-methylamino-6-hydroxypurine-9-β-D-ribofuranoside-5'-phosphoric acid ester |
|---|---|
| Aerobacter aerogenes ATCC 8308 | + |
| Arthrobacter ureafaciens ATCC 15762 | + |
| Bacillus sphaericus ATCC 10208 | + |
| Bacillus subtilis ATCC 13952 | + |
| Brevibacterium helvolum ATCC 19390 | + |
| Corynebacterium rathayi ATCC 13659 | + |
| Corynebacterium michiganense ATCC 10202 | + |
| Flavobacterium arborescens ATCC 4358 | + |
| Staphylococcus citreus ATCC 4012 | + |
| Micrococcus varians ATCC 399 | + |
| Pseudomonas boreopolis ATCC 15452 | + |
| Sarcina lutea ATCC 15176 | + |
| Serratia marcescens ATCC 19180 | + |
| Xanthomonas citri ATCC 15923 | + |
| Candida utilis ATCC 16321 | + |
| Saccharomyces cerevisiae ATCC 15248 | + |
| Zygosaccharomyces major ATCC 15249 | + |
| Streptomyces aureus ATCC 3309 | + |
| Penicillium chrysogenum ATCC 15241 | + |

EXAMPLE 9

Corynebacterium sp. ATCC 21084, Arthrobacter sp. ATCC 21085 and *Micrococcus sodonensis* ATCC 15932 are used as the seed strains instead of *Brevibacterium ammoniagenes*, respectively, and culturing is conducted in the same manner and under the same conditions as in Example 1. Consequently, 2.4 mg./ml., 1.9 mg./ml. and 0.9 mg./ml. of 2 - methyl-6-hydroxypurine-9-β-D-ribofuranoside-5'-phosphoric acid ester are accumulated in the resultant fermentation liquor, respectively.

The invention being thus described, it will be obvious that the same may be varied in many ways. Such variations are not to be regarded as a departure from the spirit and scope of the invention, and all such modifications as would be obvious to one skilled in the art are intended to be included.

We claim:
1. A process for producing a 9-β-D-ribofuranoside-5'-phosphoric acid ester of a 2-substituted-6-hydroxypurine having the formula

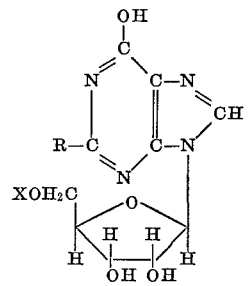

wherein

R is $CH_3$, $CH_2$—$CH_3$, SH, S—$CH_3$, S—$CH_2$—$CH_3$, NH—$CH_3$ or

and
X is

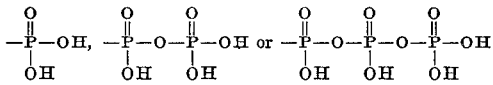

which comprises culturing a Schizomycetes or Eumycetes microorganism capable of producing said ester under aerobic conditions in an aqueous nutrient medium containing a 2-substituted-6-hydroxypurine having the formula

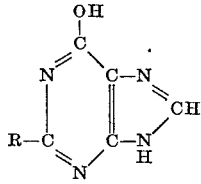

wherein

R is $CH_3$, $CH_2-CH_3$, SH, $S-CH_3$, $S-CH_2-CH_3$, $NH-CH_3$ or

accumulating said ester in the resultant culture liquor and isolating said accumulated ester.

2. The process of claim 1, wherein culturing is carried out at a temperature of about 20 to 40° C. and at a pH of about 4.0 to 9.5.

3. The process of claim 1, wherein said hydroxypurine is added to the medium at the initiation of culturing.

4. The process of claim 1, wherein said hydroxypurine is added to the medium all at one time during culturing.

5. The process of claim 1, wherein said hydroxypurine is added to the medium intermittently during culturing.

6. The process of claim 2, wherein said microorganism is *Brevibacterium ammoniagenes* ATCC 6872.

7. The process of claim 2, wherein said microorganism is Corynebacterium sp. ATTC 21084.

8. The process of claim 2, wherein said microorganism is Arthrobacter sp. ATCC 21085.

9. The process of claim 2, wherein said microorganism is *Micrococcus sodonensis* ATCC 15932.

10. The process of claim 1, wherein said ester is recovered by adsorption and elution on an ion exchange resin.

References Cited
UNITED STATES PATENTS 3,308,036   3/1967   Nakayama et al. _____ 195—28

ALVIN E. TANENHOLTZ, Primary Examiner

U.S. Cl. X.R.

260—211.5; 99—140